United States Patent [19]

Dorel

[11] Patent Number: 5,137,109
[45] Date of Patent: Aug. 11, 1992

[54] METHOD AND APPARATUS FOR CREATING SEISMIC WAVES IN A BOREHOLE

[75] Inventor: Alain Dorel, St. Cloud, France

[73] Assignee: Schlumberger Technology Corporation, Houston, Tex.

[21] Appl. No.: 655,683

[22] Filed: Feb. 14, 1991

[30] Foreign Application Priority Data

Feb. 14, 1990 [FR] France .................. 90 01716

[51] Int. Cl.$^5$ .............................................. G01V 1/40
[52] U.S. Cl. .................................................. 181/106
[58] Field of Search ...................... 181/102, 104, 106; 367/25, 911; 73/151

[56] References Cited

U.S. PATENT DOCUMENTS

| | | | |
|---|---|---|---|
| 3,718,205 | 2/1973 | Fair et al. | 181/106 |
| 3,909,776 | 9/1975 | Broding et al. | 181/106 |
| 3,978,940 | 9/1976 | Bouyoucos | 181/120 |
| 4,702,343 | 10/1987 | Paulsson | 181/106 |
| 4,715,470 | 12/1987 | Paulsson | 181/106 |
| 4,805,727 | 2/1989 | Hardee et al. | 181/106 |
| 4,815,557 | 3/1989 | Duwe | 181/106 |
| 4,862,990 | 9/1989 | Cole | 181/106 |

FOREIGN PATENT DOCUMENTS

0331428 6/1989 European Pat. Off. .

*Primary Examiner*—Ian J. Lobo
*Attorney, Agent, or Firm*—Henry N. Garrana; John H. Bouchard

[57] ABSTRACT

A seismic source for use in a borehole (10) comprises a resonant system (26) which is excited at its resonance frequency while said resonance frequency is caused to vary in controlled manner, thereby performing a frequency sweep. To this end, the pressure inside the enclosure (32) containing the reaction mass (30) of the resonant system (26) is raised to a given initial static pressure by means of a high pressure unit (60), after which the pressure inside the upper chamber (38) of the enclosure (32) is caused to vary according to a substantially sinusoidal law, by means of an electrically controlled valve (52) fed from a low pressure unit (46), while the static pressure is caused to vary regularly via a constriction (74).

26 Claims, 5 Drawing Sheets

METHOD AND APPARATUS FOR CREATING SEISMIC WAVES IN A BOREHOLE

The invention relates to a seismic source adapted for use in a borehole such as an oil well provided with a casing. The invention also relates to a method of creating seismic waves by means of a borehole seismic source.

Downhole seismic sources are used to determine the geological characteristics of the underground strata in the region surrounding the well in which the source is placed. They are designed to create sound waves and to transmit them as fully as possible to the inside wall of the cased hole. Receivers such as accelerometers, geophones, or hydrophones detect these seismic waves after they have traveled through the underground strata. After processing, the measured waves can be used to determine the characteristics of the reflecting surfaces in the strata through which they have traveled.

In a first measurement technique, the receivers are placed in wells which are different from the well in which the source is located. This technique is known as the crosswell or interwell seismic technique.

In a second measurement technique, the receivers are placed on the surface of the ground. This technique is known as the "reverse vertical seismic profile" (RVSP) technique.

Finally, the receivers may also be placed in the same borehole as the source in a third measurement technique known as the "long spacing sonic" technique.

Depending on the type of measurement to be performed, the sinusoidal force induced by the seismic source may be oriented vertically along the axis of the well so as to primarily generate compression or P-waves along the axis of the well together with shear waves orthogonal to the axis of the well, or else horizontally in order to primarily generate shear or S-waves along the axis of the well together with compression waves orthogonally to the axis of the well.

In order to enable satisfactory measurements to be taken, the peak amplitude of the sinusoidal force induced by the seismic source must be high enough for the attenuated signals picked up by the receivers to have a satisfactory signal-to-noise ratio. Conversely, the peak amplitude must not exceed certain values beyond which the cement in the well would be subjected to excessive stresses. A sinusoidal force having a peak amplitude of about 20,000N constitutes an acceptable compromise on this point.

The seismic source is usually suspended from a cable which also conveys from the surface the power to operate the source and to the surface various signals from sensors such as accelerometers associated with the source. The driving power transmitted to the seismic source (generally in electrical form) is thus limited to a relatively low value, e.g. less than 2 kW.

The publication "Downhole Periodic Seismic Sources" by Hardee, H.C., in "Geophysical Prospecting" 31, pp. 57-71 (1983), is a study of various types of downhole seismic sources. There is described a source comprising a reaction mass which is caused by fluidic excitation means to vertically oscillate at a constant frequency in a housing clamped to the wall of the well. A comparable source is described in U.S. Pat. No. 4,783,771, in the case of a hydraulic source.

British patent application 2,129,559 describes a downhole seismic source in which the electrical power transmitted by the cable serves to actuate a hydraulic pump. This pump is used, via an electrically controlled valve, to subject a reaction mass placed in a cylinder to back-and-forth motion at a variable frequency, thereby inducing the desired sinusoidal force.

In a seismic source designed in this way, it is not possible to satisfy both of the above-mentioned constraints simultaneously. In other words, it is not possible to produce forces having a peak amplitude close to 20,000N with a driving power of less than 2 kW. Conversely, a driving power of less than 2 kW does not suffice to produce peak amplitude forces which are high enough to obtain accurate and productive measurements.

In order to solve this problem, there is proposed in French patent application 2,614,108 to use a resonant system comprising a reaction mass to which a sinusoidal force is applied at an excitation frequency which coincides with the resonance frequency of the system.

However, in that document, the reaction mass is displaced by an electromagnetic system which rapidly heats up to unacceptably high temperatures. Further, the resonance frequency of the resonant system can be adjusted only when the seismic source is raised to the surface. It is therefore not possible in a single operation to perform a frequency sweep, even though such a sweep would be particularly useful for the processing of the signals picked up by the receivers.

An object of the invention is to provide a downhole seismic source whose original design makes it possible to generate a sinusoidal force of high peak amplitude in spite of a severely limited electrical power supply e.g. less than 2 kW.

Another object of the invention is to enable frequencies to be swept over a range which can be adjusted to the passband of the formation.

According to the invention, there is provided a downhole seismic source comprising a body, clamping means for clamping said body to the wall of a borehole, said body receiving a resonant system and excitation means for exciting said resonant system at an excitation frequency which is tuned to the resonance frequency of said resonant system, and means for varying the resonance frequency of the resonant system in controlled manner while actuating the excitation means.

Preferably, the resonant system comprises a moving reaction mass in a first enclosure formed inside the body, said mass defining inside the enclosure two opposite chambers which communicate with respective resilient means, the excitation means including means for applying hydraulic pressure in at least one of the opposite chambers, with said hydraulic pressure undergoing sinusoidal variation at said excitation frequency, and said means for varying the resonance frequency comprising means for applying a static hydraulic pressure in the first enclosure, and for causing the static pressure to vary in controlled manner.

The resonance frequency may then be varied by applying an initial static pressure in the first enclosure, and then causing said pressure to vary progressively while the sinusoidal pressure is being applied.

In a preferred embodiment of the invention, a seismic source is advantageously used comprising three superposed enclosures containing, from the bottom up, the resonant system, a low pressure hydraulic unit producing the sinusoidal pressure via an electrically controlled valve subjected to alternating actuation, and a high pressure hydraulic unit for producing the initial static pressure. The decrease in the static pressure is then obtained by means of a second electrically controlled valve which causes the enclosure containing the resonant system to communicate with a low pressure tank via a constriction of adjustable cross-section.

In this embodiment, the high pressure hydraulic unit is also used via a third electrically controlled valve to actuate the means for clamping the source in the well. The clamping means may advantageously be placed between the bottom two enclosures.

In another embodiment, the seismic source comprises two superposed enclosures. The lower enclosure accommodates the resonant system and a piezoelectric stack which generates the sinusoidally varying pressure. The upper enclosure receives the high pressure hydraulic unit and the electrically controlled valve which respectively produce the initial static pressure and progressively reduce this pressure.

The source is preferably controlled by an electronic control module situated above the body of the source and connected thereto by a cable suitable for mechanically decoupling the electronic module from the body of the source. Only the body of the source is clamped in the well, thereby reducing the active mass of the source and minimizing the bending forces on the clamping means.

There is also provided in accordance with the invention a method of generating seismic waves from a borehole by means of a downhole seismic source comprising a resonant system and excitation means for exciting said resonant system, said resonant system being excited at a frequency which is tuned to the resonance frequency of the system, said method comprising the step of causing the resonance frequency of the system to vary in controlled manner while the system is being excited, thereby causing a frequency sweep to take place at an excitation frequency which remains tuned to the resonance frequency of the resonant system.

A preferred embodiment of the invention is described below by way of non-limiting example with reference to the accompanying drawings, in which.

Figure 1:
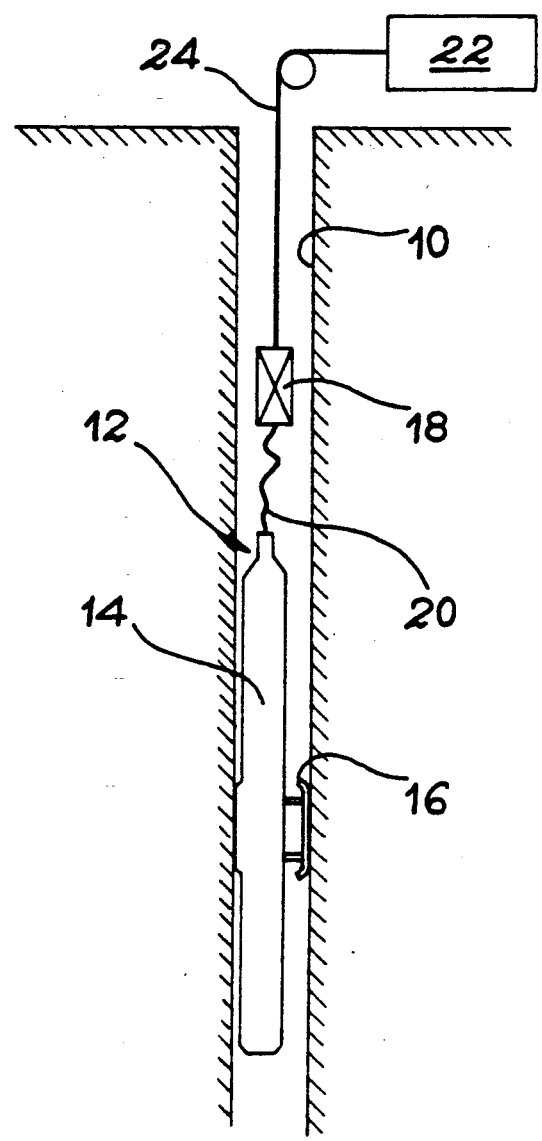
FIG. 1 is a diagrammatic section view showing a seismic source according to the invention installed in an oil well.

In FIG. 1, reference 10 designates a well fitted with a casing, passing through underground formations which are to be analyzed. To this end, a seismic source given a general reference 12 is lowered down the cased hole 10. Depending on the measurement technique used, receivers are placed either in other, adjacent boreholes (crosswell technique) or else on the surface of the ground (RVSP technique).

Whichever measurement technique is used, the seismic source 12 is actuated successively at different depths and the signals detected by the receivers are analyzed in order to determine the characteristics of the various reflecting interfaces in the formations surrounding the hole 10.

The seismic source 12 of the invention comprises a main module 14 containing the source per se and designed to be capable of being clamped firmly in the cased hole 10 by clamping means 16. Above the main module 14, the source also comprises an electronic control module 18 which is connected to the main module 14 by a cable which is slack when the clamping means 16 are in action. The slack in the cable 20 provides mechanical decoupling between the seismic source and the electronic control module 18, thereby reducing the mass and the length of the active portion of the source.

The electronic control module 18 controls the seismic source 12 on the basis of information transmitted from an electronic unit 22 situated on the surface, with transmission taking place via a cable 24 from which the electronic control module 18 is suspended.

The main items constituting the main module 14 are described with reference to FIG. 2. The physical arrangement of items inside the module 14 is then described with reference to FIGS. 3 and 4.

Figure 2:
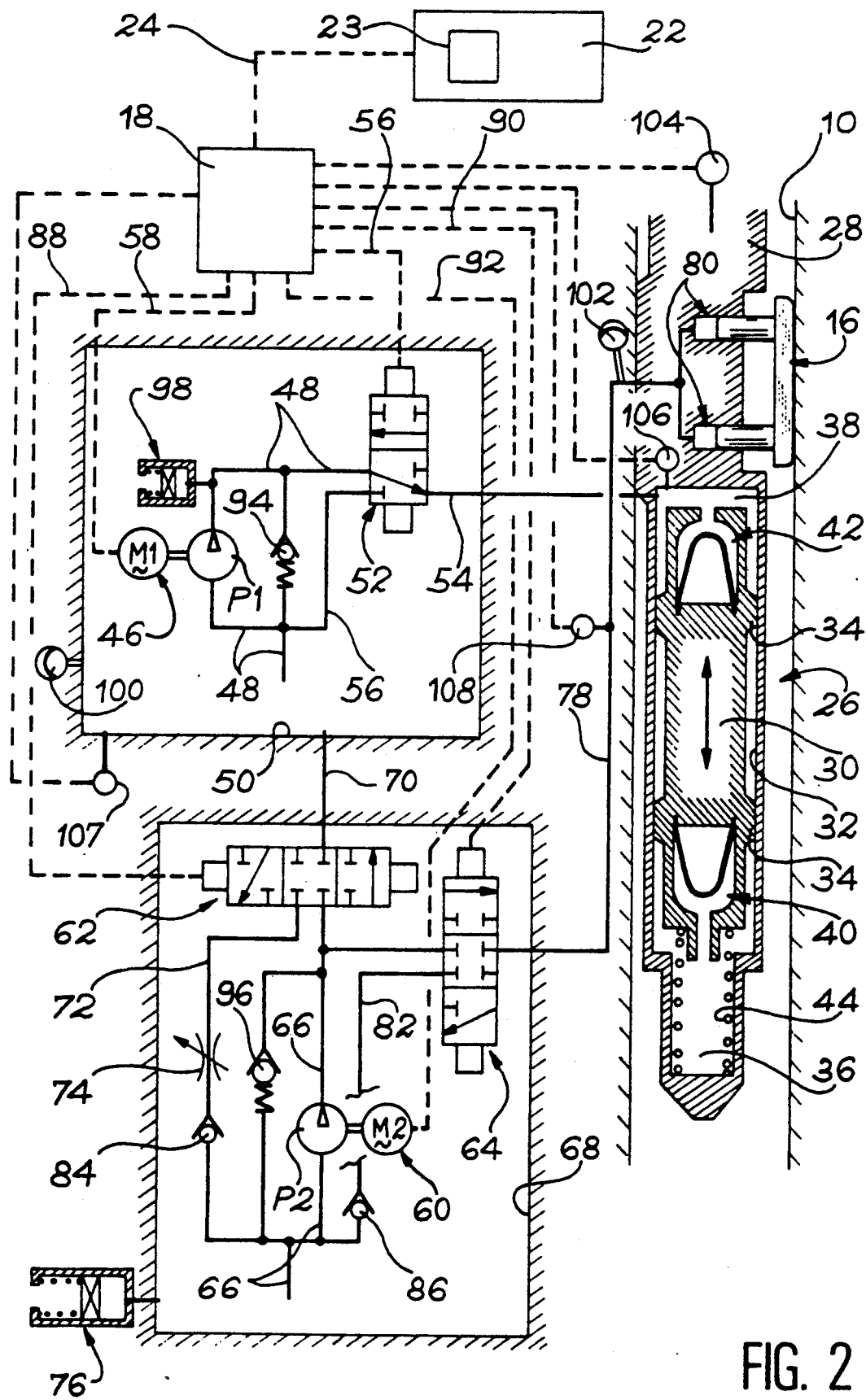
FIG. 2 is a diagrammatic representation of the main components of the downhole seismic source according to the invention.

The righthand side of FIG. 2 is a highly diagrammatic representation of the bottom portion of the elongate cylindrical body 28 of the main module 14, which body houses a resonant system 26 immediately below the clamping means 16. The resonant system 26 comprises a reaction mass 30 which is movable parallel to the axis of the body 28 inside a sealed cylindrical enclosure 32 which is filled with hydraulic fluid. The motion of the mass 30 inside the enclosure 32 is guided by two smooth bearings 34 which form a passage of small section for the hydraulic fluid contained in the enclosure 32.

The reaction mass 30 thus delimits a bottom chamber 36 and a top chamber 38 inside the enclosure 32, which chambers communicate with each other via the small section passage formed by the smooth bearings 34.

The resonant system 26 also comprises resilient means constituted by two oleopneumatic accumulators 40 and 42 which communicate respectively with the bottom chamber 36 and with the top chamber 38. In each of these accumulators 40 and 42 a pocket of compressed gas or air is separated from the hydraulic fluid contained in the corresponding chamber 36 or 38 by means of a flexible membrane. When the hydraulic fluid contained in the enclosure 32 is under pressure, the assembly constituted by the reaction mass 30 and by the oleopneumatic accumulators 40 and 42 constitutes a resonant system whose resonant frequency varies as a function of the pressure of the hydraulic fluid contained in the enclosure.

In the embodiment shown in FIG. 2, the oleopneumatic accumulators 40 and 42 are connected at respective ends of the mass 30. In another embodiment (not shown), these accumulators could be housed in the body 28 of the main module.

In order to ensure that the mass 30 occupies a central equilibrium position inside the enclosure 32 when the seismic source is not actuated, a compression spring 44 is interposed between the bottom face of the enclosure 32 and the bottom face of the mass 30. This spring 44 balances the weight of the reaction mass 30 and keeps it in the desired position.

In order to make the reaction mass 30 as compact as possible, it is made of a high density material such as uranium or tungsten. Its mass may be of about 100 kg, for example.

As shown very diagrammatically in FIG. 2, the main module of the seismic source of the invention also includes a low pressure unit 46 comprising an electric motor M1 which drives a pump P1 for delivering low pressure hydraulic fluid (at about 60 bars) at a relatively high flow rate (about 15 liters/min). The pump P1 is placed in a duct 48 which connects a second enclosure 50 formed inside the body 28 of the main module to a first inlet orifice of an electrically controlled valve 52 having one of its outlet orifices communicating via a duct 54 with the top chamber 38 formed in the enclosure 32. The second inlet of the valve 52 communicates directly with the enclosure 50 via a duct 56.

The electrically controlled valve 52 is suitable for alternating between a first position (bottom position in FIG. 2) in which the duct 54 communicates with the first inlet having the duct 48 connected thereto, and a second position (top position in FIG. 2) in which the duct 54 communicates with the second inlet having the duct 56 connected thereto. In practice, the valve 52 may be constituted by one or more elementary electrically controlled valves.

In the embodiment shown, the low pressure unit 46 is housed directly inside the enclosure 50 together with the valve 52 and the ducts 48 and 56.

Electrical conductors 58 passing through the body 28 and also along the slack cable 20 connect the valve 52 to the electronic control module 18. When the seismic source is put into operation, the electronic module causes the state of the valve 52 to change so that it alternates between its two positions at a determined frequency. Under the effect of this change of state, the upper chamber 38 communicates in alternation with the pump P1 and directly with the enclosure 50. Given that the electric motor M1 is also connected to the electronic control module 18 by an electrical conductor 58, the alternating actuation of the valve 52 causes the pressure in the upper chamber 38 to vary sinusoidally.

In practice, the excitation frequency of the valve 52 lies between about 30 Hz and about 120 Hz. Given the small section passage constituted by the smooth bearings 34, head losses are high between the bottom chamber 36 and the chamber 38. It may therefore be assumed that dynamic sealing is provided between the two chambers for pressures varying in the frequency range 30 Hz to 120 Hz.

The main module 14 of the seismic source 12 also includes a high pressure unit 60 comprising an electrical motor M2 driving a pump P2. This high pressure unit 60 delivers high pressure (about 400 bars) at a relatively low flow rate (about 0.15 liter/min). It serves, via an electrically controlled valve 62, to establish an initial static hydraulic pressure inside the enclosure 32 of the resonant system 26 prior to the low pressure unit 46 being put into operation. It also serves, via another electrically controlled valve 64, to control the actuation of the clamping means 16.

In order to perform the first of these functions, the pump P2 is placed in a duct 66 which connects a low pressure tank defined by a third enclosure 68 formed in the body 28 to a first inlet orifice of the valve 62. One of the outlet orifices of the valve 62 (to the right in FIG. 2) communicates with the second enclosure 50 via a duct 70 so that the effect of actuating the pump P2 is to increase the pressure inside the second enclosure 50. Given that the second enclosure 50 is in permanent communication with the first enclosure 32 of the resonant system 26 via the electrically controlled valve 52 and the duct 54, it is possible to raise the pressure inside the upper chamber 38 in this way to a maximum value of about 400 bars. Because the mass can move over the smooth bearings 34, the pressure in the bottom chamber 36 is raised to the same value.

The second inlet to the valve 62 communicates with the low pressure tank formed by the third enclosure 68 via a duct 72 which includes a constriction 74 whose cross-section is advantageously adjustable. When the second inlet orifice of the valve 62 is in communication with the outlet orifice connected to the duct 70, the pressure in the second enclosure 50 and consequently the pressure in the first enclosure 32 is caused to drop progressively and in controlled manner.

When at rest, the valve 62 (which may in practice be constituted by one or more elementary electrically controlled valves) occupies a position as shown in FIG. 2 in which there is no communication between the duct 70 and either of the ducts 72 and 66. In a first active position of the valve 62, shown to the right in FIG. 2, the duct 66 is in communication with the duct 70 while the duct 70 remains isolated from the duct 72. This position therefore corresponds to increasing the pressure inside the chambers 50 and 32. In contrast, in a second active position of the valve 62, shown to the left in FIG. 2, the duct 66 no longer communicates with the duct 70, and the duct 70 communicates with the duct 72. This second active position corresponds to a regular and progressive drop in the pressure inside the enclosures 50 and 32.

In order to enable the pressure inside the low pressure chamber constituted by the enclosure 68 to be constant, independent of the external pressure, this enclosure 68 communicates with a pressure regulating accumulator 76. The initial adjustment of this accumulator may serve, for example, to keep the enclosure 68 permanently at a constant pressure of about 40 bars.

As mentioned above, the high pressure unit 60 also serves to control the clamping means 16 via the valve 64. To this end, a first inlet of the valve 64 is connected as a branch on the duct 66, downstream from the pump P2. A first outlet from the valve 64 communicates via a duct 78 with actuators 80 for actuating the clamping means 16. When the valve 64 causes the first inlet to communicate with the first outlet, the effect of actuating the pump P2 is to actuate the actuators 80 so as to clamp the main module of the seismic source in the borehole.

The second inlet of the valve 64 is connected by a duct 82 directly to the low pressure chamber delimited by the enclosure 68. Consequently, when the duct 78 is connected to the duct 82 via the valve 64, the pressure inside the actuator 80 is released and the main module of the seismic source is no longer clamped in the borehole.

Non-return valves 84 and 86 are placed in the ducts 72 and 82 respectively in order to prevent any hydraulic fluid flow from the enclosure 68 towards the valves 62 and 64 via these ducts.

Like the valves 62, the valves 64 may be constituted by one or more elementary electrically controlled valves. When in the rest position illustrated in FIG. 2, this valve 64 normally occupies a position in which none of its inlet orifices is in communication with the outlet orifice to which the duct 78 is connected.

In a first active position of the valve 64 shown at the top of the valve in FIG. 2, the inlet orifice connected to the duct 66 communicates with the outlet orifice connected to the duct 78. This position thus corresponds to the actuators 80 being actuated.

In contrast, in a second active position shown at the bottom of the valve in FIG. 2, the outlet orifice to which the duct 78 is connected communicates with the inlet orifice to which the duct 82 is connected. This second active position thus corresponds to releasing the actuators 80.

As shown diagrammatically in FIG. 2, the high pressure unit 60 is placed inside the third enclosure 68 together with the valves 62 and 64.

The valves 62 and 64 and the motor M2 are controlled from the electronic control module 18 via conductors represented diagrammatically at 88, 90, and 92. These conductors pass through the body 28 of the main module 14 and they then run along the slack cable 20.

In conventional manner, each of the pumps P1 and P2 has a duct containing a non-return valve 94 or 96 connected in parallel therewith. The pump P2 is also protected by an accumulator 98 connected to the duct 48 downstream from the pump P1.

Oleopneumatic accumulators 100 and 102 communicate respectively with the second enclosure 50 and with the duct 78 in order to take account of variations in the volume of the hydraulic fluid.

In order to provide the electronic assembly 22 on the surface with the information required for suitable knowledge of the seismic waves created by the source 12, a pressure sensor 106 is connected to the upper chamber 32 and an accelerometer 104 is fixed on the body 28 of the main module. A pressure sensor 107 is also connected to the second enclosure 50. In addition, the state of the actuators 80 may be monitored by means of a pressure sensor 108 connected to the duct 78.

The various components described above with reference to FIG. 2 will now be described in greater detail with reference to FIGS. 3 and 4.

Figure 3:
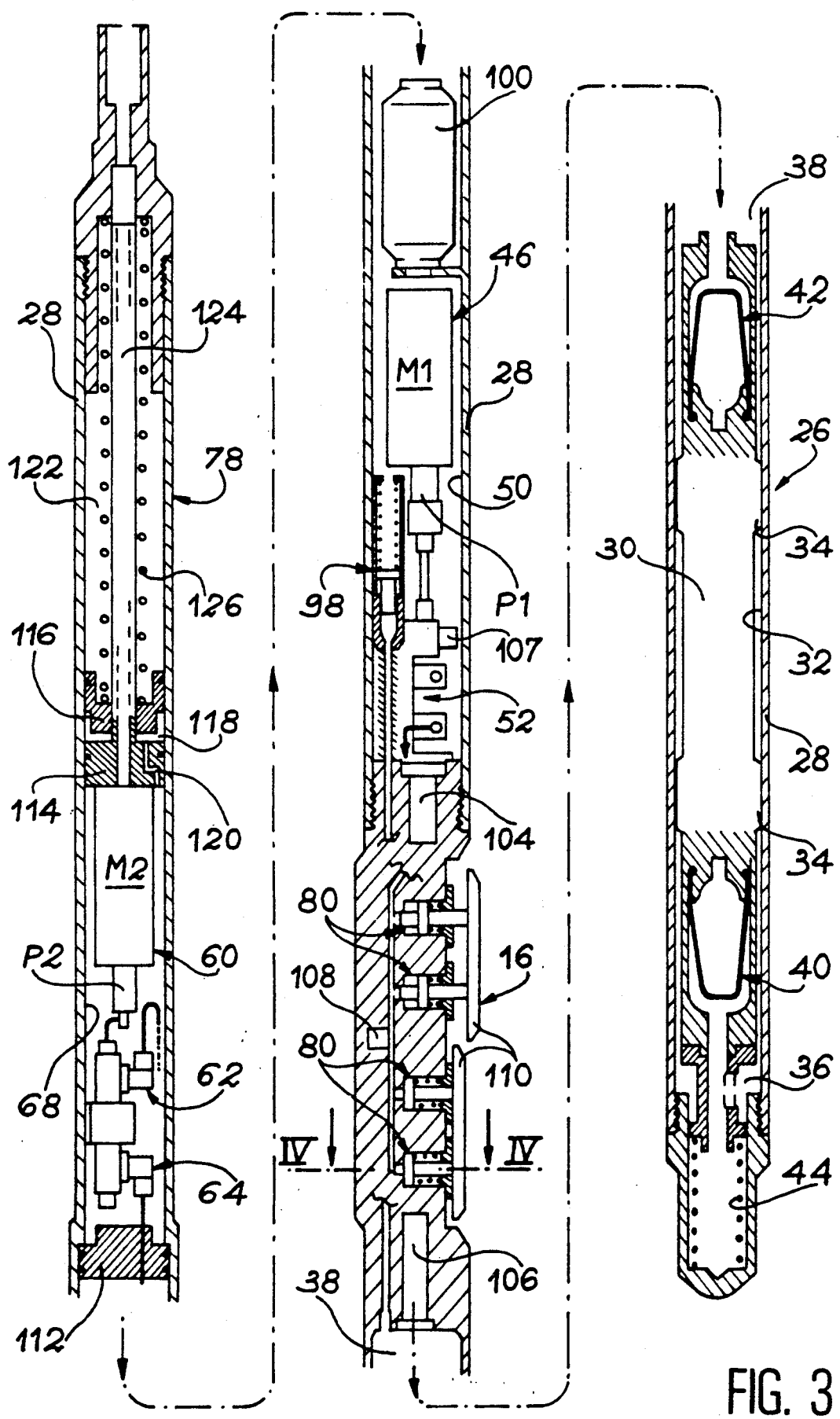
FIG. 3 is a longitudinal section in three portions showing from left to right: the top portion, the central portion, and the bottom portion of the seismic source of the invention.

As shown in FIG. 3, the body 28 of the main module 14 is generally in the form of an elongate tube in which the following are formed in succession starting from the bottom: the first enclosure 32 containing the resonant system 26; the second enclosure 50 containing, in particular, the low pressure unit 46; and the third enclosure 68 containing the high pressure unit 60. The clamping means 16 are placed between the first enclosure 32 and the second enclosure 50.

More precisely, the righthand side of FIG. 3 shows the reaction mass 30 which slides along the axis of the body 28 inside the enclosure 32 by means of the smooth bearings 34. At each of its ends, the mass 30 carries a respective one of the oleopneumatic accumulators 40 and 42 which communicate respectively with the bottom chamber 36 and with the top chamber 38 defined inside the enclosure 32 by the mass 30. The compression spring 44 can be seen which serves to hold the reaction mass 30 in its central position inside the enclosure 32, when at rest.

Figure 4:
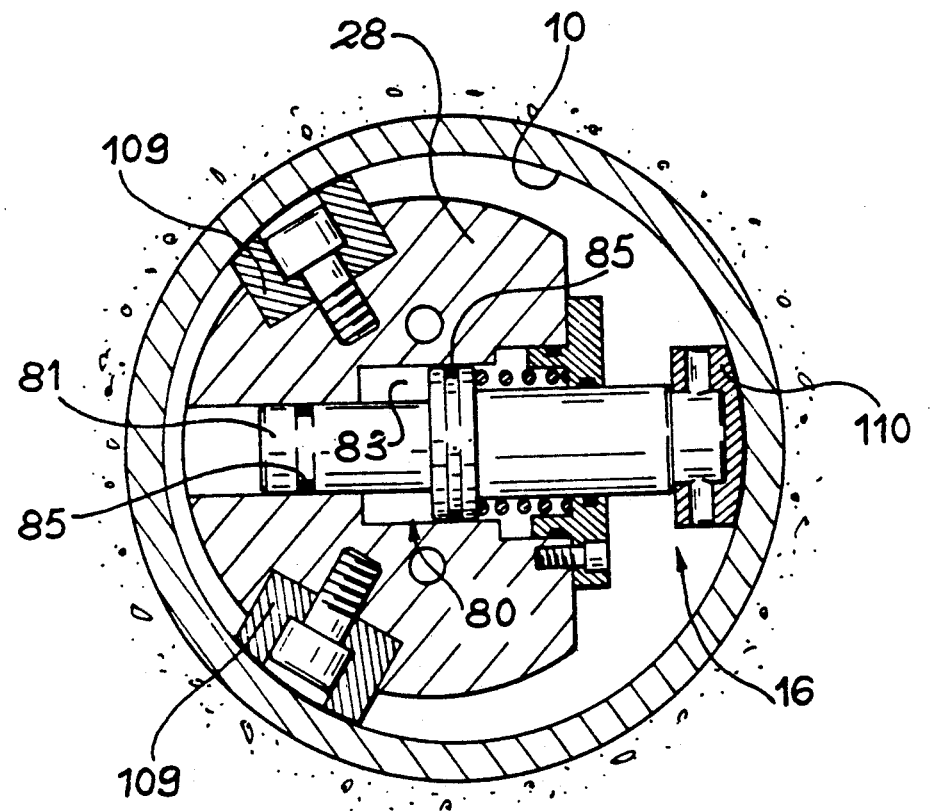
FIG. 4 is a cross-section on a larger scale on line IV—IV of FIG. 3.

Above the enclosure 32, the body 28 of the seismic source comprises a solid portion which is shown on a larger scale in FIG. 4. This solid portion of the body 28 serves to house the pressure sensor 106 in its portion adjacent to the top chamber 38.

Above the sensor 106, and as shown more clearly in FIG. 4, the solid portion of the body 28 supports two fixed thrust pads 109 extending parallel to the axis of the body 28 and projecting outwards therefrom at locations disposed substantially at 120° from each other. The solid portion of the body 28 also houses the actuator 80 for the clamping means 16. There are four of these actuators 80 in the embodiment shown and they are disposed in a single radial plane which is at about 120° to the first thrust pads 109. The piston 81 of each of the actuators 80 passes through the body 28 so that it has one end carrying a moving thrust pad 110 while its opposite end is directly subjected to the pressure in the well (this feature is not shown in FIGS. 2 and 3 in order to facilitate reading the figures). Thus, each of the pistons 81 is normally in equilibrium under the effect of well pressure and regardless of the depth at which the source is located.

Each of the actuators 80 includes a control chamber 83 which is isolated by sealing rings 85 carried by the piston 81. As can be seen in particular in FIG. 3, the application of pressure to the chambers 83 in each pair of adjacent actuators 80 serves to apply one or the other of the hinged moving thrust pads 110 against the piston 81 of each of its actuators.

Thus, when the actuators 80 are actuated, the moving thrust pads 110 are pressed against the inside surface of the cased hole 10, and by reaction the fixed thrust pads 109 are pressed against the same surface so as to obtain firm and rigid contact between the body 28 and the wall of the hole, even if the wall is slightly deformed.

As shown in FIG. 3, the solid portion of the body 28 receives the pressure sensor 108 in its zone situated level with the clamping means 16. Above the clamping means 16, the solid portion also serves as a housing for the accelerometer 104.

Above this solid portion of the body 28, the enclosures 68 and 50 are separated by a horizontal sealed partition 112. Going down from the partition 112, the following are to be found in order: inside the enclosure 50, the oleopneumatic accumulator 100, the motor M1, and the pump P1 of the low pressure unit 46. Beneath the pump P1, there are the pressure sensor 107, the valve 52, and the accumulator 98 for protecting the pump P1.

The third enclosure 68 is upwardly limited by a sealed partition 114 from which the following are to be found, going downwards: the motor M2, the pump P2 of the high pressure unit 60, and then the valves 62 and 64.

Finally, the top portion of the tubular body 28 serves to house the low pressure tank 78. This tank 78 includes a piston 116 which is movable inside the tubular body 28 in order to form a lower chamber 118 therein which communicates with the enclosure 68 via a passage 120 passing through the partition 114, and also an upper chamber 122 which is completely sealed from the outside. The piston 116 slides in sealed manner on a central rod 124 along which the electrical conductors pass. A rated compression spring 126 surrounds the rod 124 and initially maintains the piston 116 in a low position adjacent to the partition 114.

In FIGS. 3 and 4, the various ducts and the electrical conductors described above with reference to FIG. 2 are not shown again for the sake of clarity. These ducts and these conductors generally lead either into the body 28 and the partitions 112 and 120, or else into the enclosures formed inside the body 28.

When the seismic source of the invention is lowered into a borehole in order to perform measurements on the surrounding underground formations, the various elements constituting the source occupy inactive positions as shown in FIG. 2.

When the source has reached the desired depth, the valve 64 is actuated in order to put the duct 66 into communication with the duct 78. The motor M2 is then switched on in order to apply pressure to the actuator 80 of the clamping means 16.

Once the main module of the source 12 is firmly and directly clamped, the valve 62 is actuated in turn, while the motor M2 continues to be powered. The effect of actuating the valve 62 is to put the duct 66 into communication with the duct 70 opening out into the enclosure 50. The pressure in said enclosure rises slowly from its initial static pressure of about 40 bars up to a maximum pressure of about 400 bars. Given that the enclosure 50 communicates with the enclosure 32 containing the reaction mass 30 via the duct 48, the valve 52, and the duct 54, the pressure inside the upper chamber 38 and the pressure inside the lower chamber 36 rises likewise to reach the same value.

When this initial static pressure has been reached in both chambers 36 and 38, the valve 52 is excited in an alternating excitation cycle causing it to pass alternately from one of its two states to the other and back again at a determined frequency which is chosen to coincide with the resonance frequency of the resonant system 26. The pressure inside the upper chamber 38 is thus subjected to periodic oscillations having an amplitude of close to 40 bars about the static pressure which exists inside the enclosure 32.

Simultaneously with the periodic excitation of the valve 52, the valve 62 is actuated again so as to take up its second active position in which the enclosure 50 communicates with the enclosure 68 via the constriction 74. Consequently, the phenomenon of rapid pressure oscillation in the chamber 38 is accompanied by a regular and progressive decrease in the static pressure inside the chamber 32, with the static pressure falling, for example, from about 400 bars to about 50 bars over a period T which may vary between about 10 seconds to about 30 seconds depending on the size of the passage through the constriction 74.

It should be observed that the reduction in static pressure inside the enclosure 32 takes place slowly enough for the static pressure to be maintained in equilibrium between the chambers 38 and 36 via the small section passage formed by the smooth bearings 34. In contrast, the frequency of pressure variations in the upper chamber 38 induced by the alternation of the valve 52, which varies in the range 30 Hz to 120 Hz, for example, is sufficiently rapid to prevent said variation being transmitted to the lower chamber 36.

Figure 5:
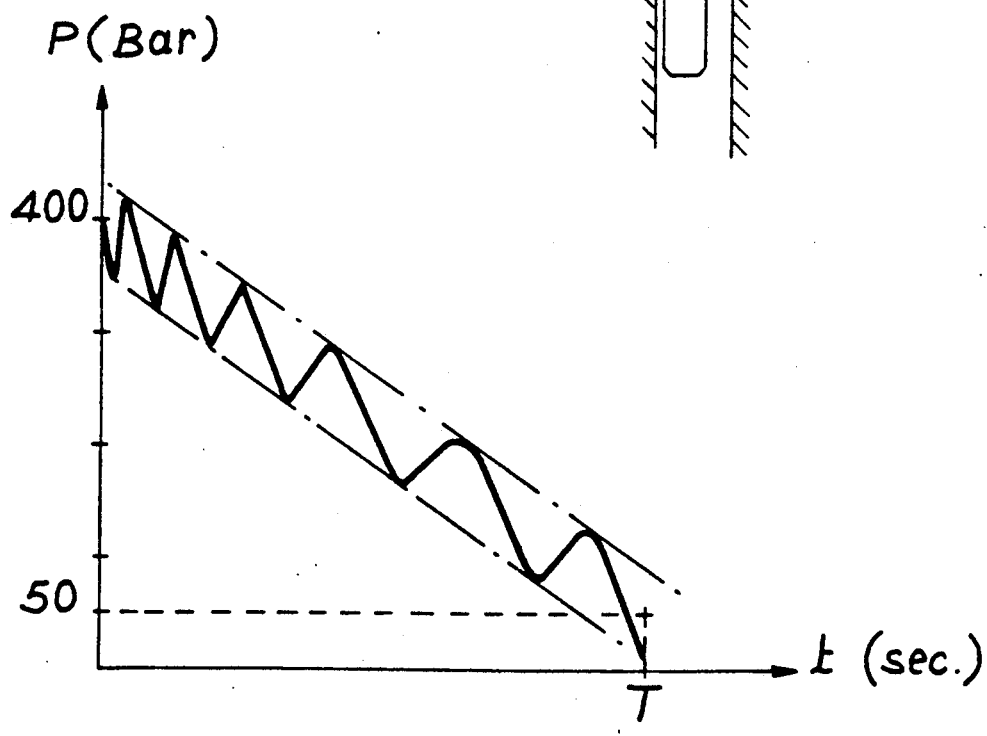
FIG. 5 is a graph showing pressure variation in the top chamber of the resonant system of the source as a function of time during actuation of the seismic source.

The controlled variation in the static pressure inside the enclosure 32 gives rise to controlled variation of the resonance frequency of the resonant system 26. In accordance with the invention, the electronic control module 18 or the surface electronic assembly 22 allows the excitation frequency of said system as induced by the alternating actuation of the valve 52 to be kept permanently in tune with the resonance frequency of the system 26, as illustrated by the graph of FIG. 5. In this way, the resonance of the system 26 provides considerable amplification of the vertical sinusoidal force induced by the source, with the force reaching as much as about 20,000N, while still providing a frequency sweep as advantageous for processing the measurements from the receivers. In particular, this frequency sweep is preferably designed so as to match the passband of the underground strata i.e. usually between about 30 Hz and about 120 Hz.

In addition, by locating the moving reaction mass 30 in an enclosure which is sealed from the fluid contained in the well, it is possible to prevent the waves induced by the movement of said mass propagating in the fluid of the well.

In the preferred embodiment of the invention, the servo controlling of the excitation frequency of the valve 52 to the resonance frequency of the resonant system 26 is achieved on the basis of measurements performed by the pressure sensors 106 and 107 which respectively measure the pressure in the upper chamber 38 of the resonant system 26 and the pressure in the enclosure 50. These pressures are related respectively to the hydraulic fluid flow rate induced by the alternating displacement of the reaction mass 30 and to the hydraulic fluid flow rate injected by the valve 52. Consequently, by maintaining a permanent phase difference of 90° between the alternating component of the pressure inside the enclosure 50 relative to the alternating component of the pressure measured inside the chamber 38 by the pressure sensor 106, it is possible to sustain resonance in the resonant system 26 for a minimum amount of driving energy.

In order to achieve this result, the signals delivered by each of the pressure sensors 106 and 107 are initially filtered in order to eliminate the DC component so as to retain only the AC component. Thereafter the phase of the AC component of each of these signals is measured, and the phase difference is then calculated. So long as the phase different remains equal to $90° \pm E$ (where E is an acceptable error, e.g. 5°), then the frequency of the excitation signal for the valve 52 is not changed.

Otherwise, if the phase difference is greater than $90° + E$ or less than $90° - E$, then the frequency of the excitation signal of the valve 52 is changed. Each change consists in increasing or reducing the frequency by a given value, depending on whether the phase difference is greater than $90° + E$ or less than $90° - E$, respectively.

In practice, the above-described servo-controlled functions (measuring the phases of the two signals, calculating the phase difference, comparing with the desired phase difference of $90° \pm E$, and delivering an alternating signal whose frequency is servo-controlled) may be performed by an apparatus sold by the firm Bruel & Kjaer under the name "Resonance Dwell Unit - Type 5885" in association with a "Vibration Exciter Control 1050" supplied by the same firm. These servo-control means 23 (FIG. 2) are located at the surface in the electronic assembly 22 and connected to the electronic module 18 via three electrical conductors in the cable 24. The filtering of the signals delivered by the pressure sensors 106 and 107 is provided by the electronic module 18.

The frequencies of the two pressure measurement signals transmitted to the surface via the cable 24 as well as the frequency of the signal for controlling the valve 52 as transmitted downhole along the same cable (which frequencies vary between 30 Hz and 120 Hz) are close to the frequency of the power signals transmitted downhole by the cable 24 in order to power the motors M1 and M2 (60 Hz). Consequently, in order to avoid any interference between the power signals and the measurement signals and the control signal within the cable, the two measurement signals are modulated in the electronic module 18, e.g. at 10 kHz and at 20 kHz, and are then demodulated at the surface. In the opposite direction, the control signal for the valve 52 is modulated at the surface at a third frequency, and is demodulated by the electronic module 18.

In a modified embodiment, the servo-control means may be placed directly in the electronic module 18. This embodiment also has the advantage of increasing the availability of the cable for transmitting other electrical signals.

Figure 6:
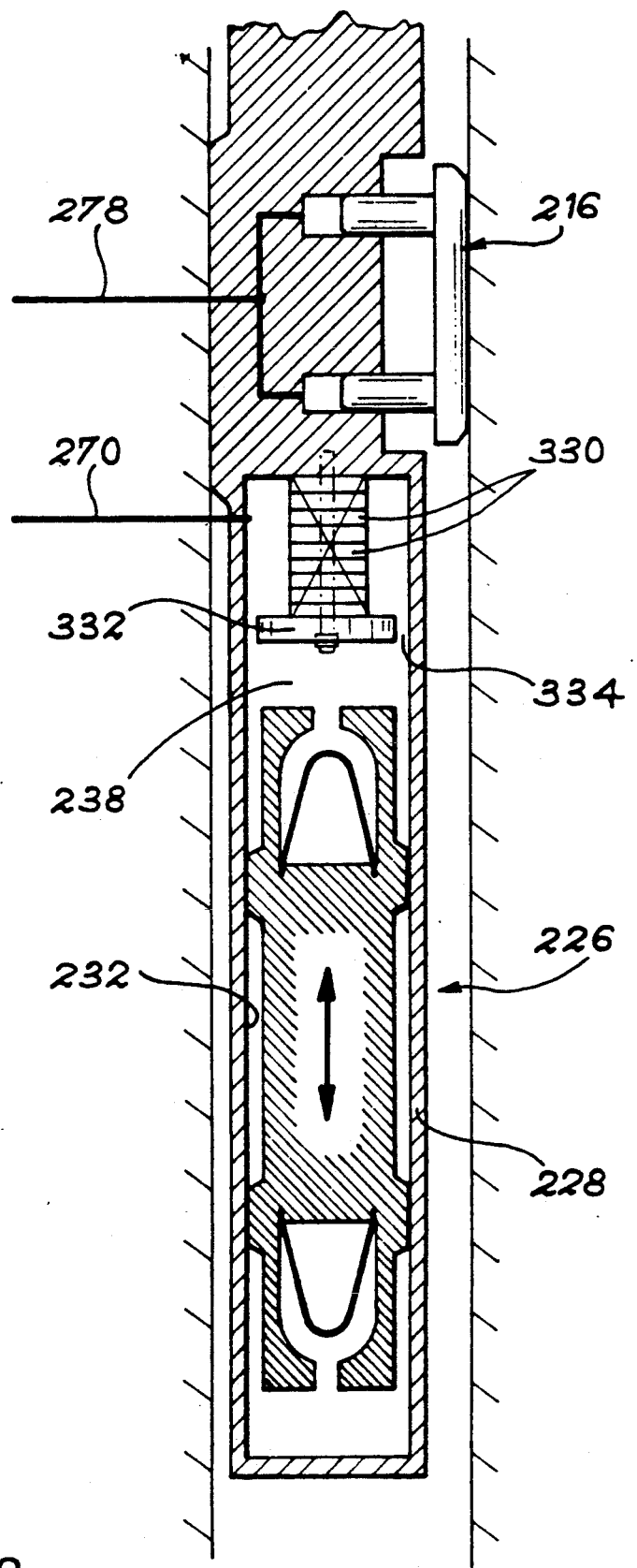
FIG. 6 is a schematic longitudinal section showing the lower portion of the source, in a modified embodiment.

FIG. 6 shows a modified embodiment, especially suitable for operation at higher frequencies i.e. in the range of about 100 to 1000 Hz. On this figure, parts fulfilling the same functions as in the first embodiment will be referred to by the same reference numerals, increased by 200.

The resonant system 226, not shown in detail, is structurally identical with the resonant system 26 of FIGS. 2 and 3. The same is true for the part of the source (not shown) which is operable to produce the initial static pressure and to progressively decrease this pressure, and which communicates directly with the upper chamber 238 of enclosure 232 via duct 270.

In contrast, the means for varying the pressure in enclosure 232 according to a sinusoidal law are quite different, and comprise a stack of piezoelectric ceramic discs 330, having one end secured to the upper face of enclosure 232 and the opposite end of which mounts a piston 332.

The ceramic stack 330 and piston 332 are located above the resonant system 226, along the vertical axis of body 228. Piston 332 divides chamber 238 into two variable-volume portions which communicate with each other via an annular duct 334 of reduced cross-section, formed between the peripheral edge of piston 332 and the cylindrical inner surface of enclosure 232.

Piston 332 is connected to the upper face of enclosure 232 by a prestress rod (not shown) going through the piezoelectric discs 330 according to the axis of body 228. This connection is such that the piezoelectric discs are subjected to the prestress required for their operation. For this purpose, a screw or nut is provided at the end of the rod.

The discs 330 carry on each of their faces connection tabs for their parallel connection to a supply circuit (not shown) which yields electrical pulses at a pre-determined, adjustable frequency. Each of these pulses causes an increase in the thickness of the piezoelectric stack 330, and therefore, a downward displacement of piston 332. Between two consecutive pulses, the discs 330 are returned to their initial thickness and displace the piston 332 upwards in enclosure 232.

Given the frequency of the pulses applied to the piezoelectric ceramic discs 330, there is not enough time for pressure balance to be reached on both sides of piston 332 via annular duct 334 of reduced cross-section. Accordingly, a sinusoidally varying hydraulic pressure is applied below piston 332 at the frequency of the pulses applied to the discs. By permanently tuning this frequency to the resonance frequency of the resonant system 226, while causing this resonance frequency to vary as in the firstly described embodiment, there is achieved a frequency sweep which is adjustable with regard to the passband of the formation.

In this embodiment, enclosure 68 is removed, so that enclosure 50 (not shown on FIG. 6) is located immediately above enclosure 232, only the clamping means 216 being disposed between the two enclosures.

Naturally, the invention is not limited to the embodiments described above by way of example, but covers any modifications. Thus, the use of a magnetostrictive or electrodynamic system for producing the sinusoidally varying hydraulic pressure is within the ambit of the invention.

Furthermore, the high pressure unit 60 may be connected to each of the chambers 36 and 38 via the valve 62. In this case, the two chambers may be sealed from each other.

I claim:

1. A downhole seismic source comprising a body adapted to be clamped to the wall of a borehole by clamping means, said body containing a resonant system and excitation means for exciting said resonant system at an excitation frequency which is tuned to the resonance frequency thereof, the source further comprising means for varying the resonance frequency of the resonant system in a controlled manner while actuating the excitation means and wherein the resonant system comprises a movable reaction mass in a first enclosure formed inside said body, said mass defining two opposite chambers inside the enclosure and communicating with respective resilient means, the excitation means including means for applying hydraulic pressure in at least a first one of said opposite chambers, said hydraulic pressure varying sinusoidally at said excitation frequency, and said means for varying the resonance frequency comprising means for applying a static hydraulic pressure in said first enclosure and for causing said static pressure to vary in a controlled manner.

2. A seismic source according to claim 1, wherein the means for applying static hydraulic pressure and for varying it in controlled manner comprise means for applying an initial static pressure in the first enclosure and means for controlling progressive variation of said initial static pressure.

3. A seismic source according to claim 2, wherein the means for applying the initial static pressure comprise a high pressure hydraulic feed unit adapted for communication with said first enclosure via a first electrically controlled valve.

4. A seismic source according to claim 3, wherein said means for controlling a progressive decrease of the initial static pressure comprise a constriction placed in a duct controlled by the first electrically controlled valve and through which the first enclosure communicates with a low pressure tank.

5. A seismic source according to claim 4, wherein said constriction has an adjustable cross-section.

6. A seismic source according to claim 4, wherein the low pressure tank is defined in a second enclosure containing the high pressure hydraulic feed unit and the first electrically controlled valve, said second enclosure communicating with a pressure regulating accumulator.

7. A seismic source according to claim 5, wherein the low pressure tank is defined in a second enclosure containing the high pressure hydraulic feed unit and the first electrically controlled valve, said second enclosure communicating with a pressure regulating accumulator.

8. A seismic source according to claim 4, wherein the clamping means comprise at least one hydraulic actuator communicating with the high pressure hydraulic feed unit via a second electrically controlled valve.

9. A seismic source according to claim 5, wherein the clamping means comprise at least one hydraulic actuator communicating with the high pressure hydraulic feed unit via a second electrically controlled valve.

10. A seismic source according to claim 6, wherein the clamping means comprise at least one hydraulic actuator communicating with the high pressure hydraulic feed unit via a second electrically controlled valve.

11. A seismic source according to claim 8, further including means for measuring the pressure inside the hydraulic actuator.

12. A seismic source according to claim 8, wherein each of the hydraulic actuators comprises a piston passing right through the body, a moving pad hinged to the pistons of two adjacent hydraulic actuators, the body also supporting two fixed thrust pads.

13. A seismic source according to claim 11, wherein each of the hydraulic actuators comprises a piston passing right through the body, a moving pad hinged to the pistons of two adjacent hydraulic actuators, the body also supporting two fixed thrust pads.

14. A seismic source according to claim 4, wherein said duct opens into a third enclosure containing a low pressure hydraulic feed unit in communication with at least one of said chambers through a third electrically controlled valve for applying a sinusoidally varying hydraulic pressure.

15. A seismic source according to claim 6, wherein the third enclosure is disposed between the first enclosure and the second enclosure, inside said body, the first enclosure being below when the source is in a borehole.

16. A seismic source according to claim 6, wherein the third enclosure is disposed between the first enclosure and the second enclosure, inside said body, the first enclosure being below when the source is in a borehole.

17. A seismic source according to claim 15, wherein said clamping means are located between the first enclosure and the third enclosure.

18. A seismic source according to claim 14, comprising means for measuring pressure in at least one of said chambers, means for measuring pressure in the third enclosure, and servo-control means responsive to measurement signals delivered by said two pressure measurement means in order to deliver an alternating control signal to the third valve with a phase difference of about 90° relative to the alternating component of the measurement signal delivered by the means for measuring pressure in at least one of the chambers.

19. A seismic source according to claim 4, wherein said duct opens directly into the first enclosure, said means for applying a sinusoidal hydraulic pressure including at least a stack of piezoelectric elements located in the first enclosure between an end wall of the first enclosure and a piston dividing the first enclosure into two variable-volume portions in communication with each other through a duct of reduced cross-section.

20. A seismic source according to claim 19, wherein the first enclosure and the second enclosure are arranged in this order inside said body, the first enclosure being at the bottom and the first chamber being located at the top of this first enclosure when the source is in a borehole.

21. A seismic source according to claim 20, wherein said clamping means are located between the first enclosure and the second enclosure.

22. A seismic source according to claim 1, wherein each of the resilient means is constituted by an oleopneumatic accumulator.

23. A seismic source according to claim 1, wherein the reaction mass is slidable inside the first enclosure parallel to the longitudinal axis of the body, resilient means holding the reaction mass in a middle position inside the first enclosure, when at rest.

24. A seismic source according to claim 23, wherein the reaction mass is slidably mounted in the first enclosure via two smooth bearings forming a passage of reduced cross-section between the said opposite chambers, the means for applying static hydraulic pressure in the first enclosure communicating with at least one of said chambers via said means for applying a sinusoidally varying hydraulic pressure.

25. A seismic source according to claim 1, further including means for measuring the accelerations transmitted to the body by the resonant system.

26. A seismic source according to claim 1, further including an electronic control module having no clamping means and situated outside the body and above the body when the source is in place in a borehole, said control means being connected to said body by a cable adapted to mechanically decouple the electronic control module from the body.

* * * * *